United States Patent
Chandy

(10) Patent No.: US 6,738,700 B2
(45) Date of Patent: May 18, 2004

(54) METHOD FOR CONFORMING A SIGNAL TO A FAULT REQUIREMENT USING A COMMAND LIMITING SCHEME

(75) Inventor: Ashok Chandy, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/376,843

(22) Filed: Feb. 28, 2003

(65) Prior Publication Data

US 2003/0182039 A1 Sep. 25, 2003

Related U.S. Application Data

(60) Provisional application No. 60/366,307, filed on Mar. 20, 2002.

(51) Int. Cl.[7] ............................................. A01B 69/00
(52) U.S. Cl. ............................. 701/43; 701/29; 701/39; 701/41
(58) Field of Search .............................. 701/29, 34, 39, 701/41, 43; 180/402, 443

(56) References Cited

U.S. PATENT DOCUMENTS

| | | | |
|---|---|---|---|
| 4,101,849 A | * | 7/1978 | Blackmer et al. ............. 333/14 |
| 5,636,137 A | * | 6/1997 | Hazelden ..................... 702/43 |
| 5,811,695 A | * | 9/1998 | Satoh et al. ........... 73/862.331 |
| 5,920,174 A | * | 7/1999 | Kawada et al. ............. 318/663 |
| 6,272,430 B1 | * | 8/2001 | Krasner ...................... 701/207 |
| 6,389,338 B1 | | 5/2002 | Chandy et al. ................ 701/29 |

* cited by examiner

Primary Examiner—Gertrude A. Jeanglaude
(74) Attorney, Agent, or Firm—Michael D. Smith

(57) ABSTRACT

A method for conforming an input signal to fault requirements comprising: receiving an input signal; dividing the input signal into a low frequency component and a high frequency component; limiting the low frequency component to a maximum value, to create a limited signal; and combining the limited signal and the high frequency component, to create a limited command signal. A system for conforming an input signal to fault requirements comprising: an input signal in operable communication with a low pass filter. The input signal is also in operable communication with one of: a high pass filter and a first summing device in operable communication with said low pass filter. The system also includes a maximum value limiting device in operable communication with the low pass filter. A second summing device is in operable communication with the maximum value limiting device and one of, the high pass filter and the first summing device.

25 Claims, 2 Drawing Sheets

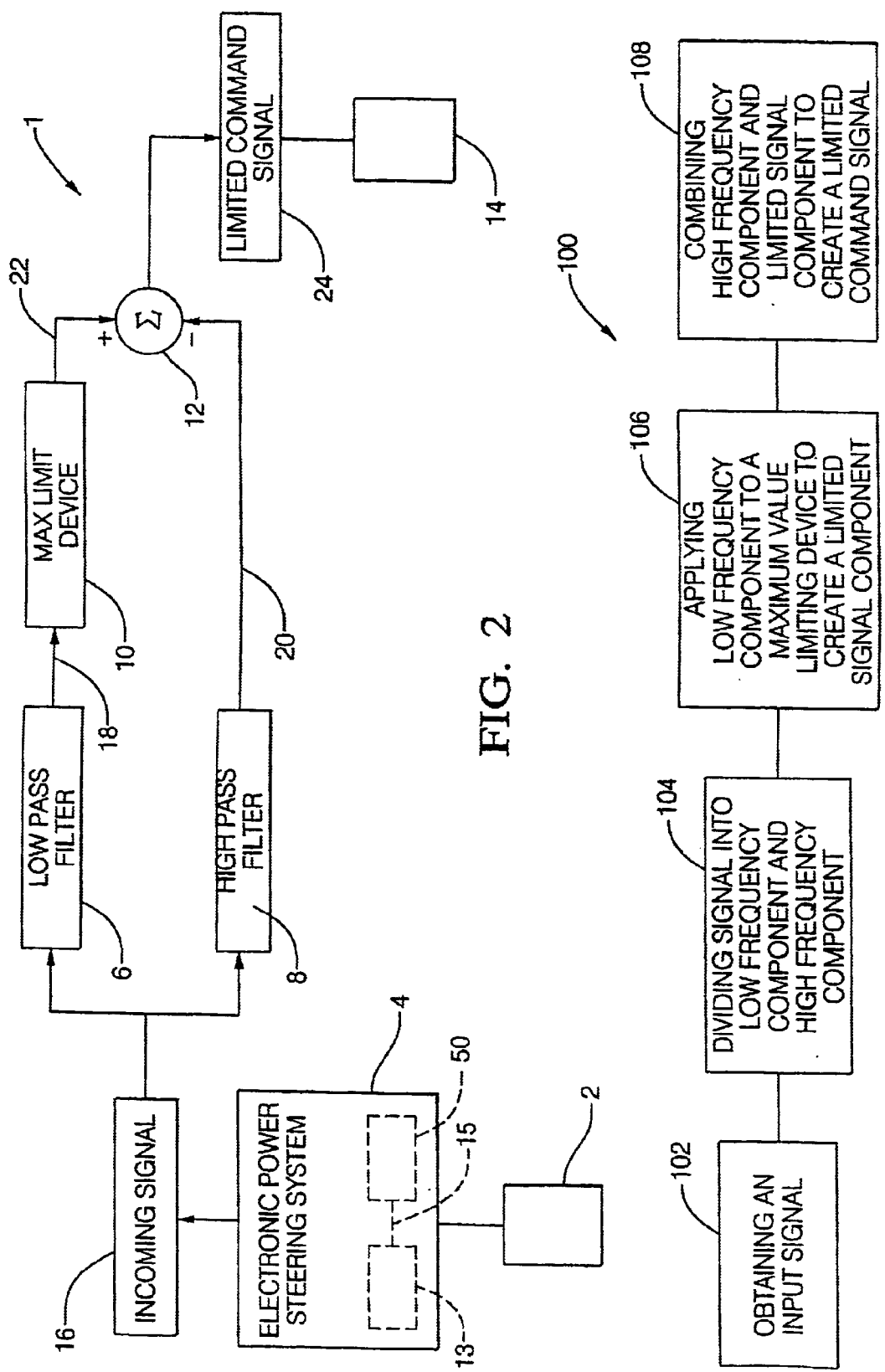

METHOD FOR CONFORMING A SIGNAL TO A FAULT REQUIREMENT USING A COMMAND LIMITING SCHEME

CROSS-REFERENCE TO RELATED APPLICATIONS

This application claims the benefit of U.S. Provisional Application No. 60/366,307, filed Mar. 20, 2002 the contents of which are incorporated by reference herein in their entirety.

BACKGROUND

Electric power steering (EPS) systems have been the subject of development by auto manufacturers and suppliers for over a decade because of its fuel economy and ease-of-control advantages compared with traditional steering systems, such as hydraulic power steering (HPS) systems. These EPS systems reduce the effort required to control a vehicle by sensing an input from a vehicle operator, via a steering wheel, and generating a torque command that transmits a force to a steering gear assembly thus aiding the vehicle operator in controlling the vehicle. However, some potential problems may arise because the input of the EPS system into the steering action has a direct affect on the driver feel or feedback from the road wheel. As a consequence, any error in the hardware and/or software of the EPS system directly affects driver control of the vehicle.

Thus, because EPS systems are at the heart of vehicle control, vehicle safety standards outlining acceptable EPS system operational guidelines have been developed in order to prevent or minimize potential vehicular accidents that may be caused by any EPS system errors or failures that may occur. As a result of these guidelines, vehicle level safety requirements have been established that promulgate thresholds for allowable errors in the torque commands generated by an EPS system.

Referring to FIG. 1, a graph 200 representing an example of vehicle level safety requirement standards is shown. These requirements, which are commonly expressed as a function of an allowable torque error per event time, takes the form of an allowable steady state value for a relatively infinite amount of time and a progressively increasing allowable error for shorter time durations. For an EPS system to be able to handle errors in the system hardware and/or software, the EPS system may have a diagnostic and/or regulatory capability that senses when an error has occurred, that diagnoses and determines what corrective action is required and that performs this corrective action to limit these errors to be within the requirements established by vehicle safety standards. In addition, external commands may also be used to communicate actions or problems to the EPS system, such as a vehicle stability augmentation signal sent to a vehicle steering system from a brake controller, where little is known about the brake software or communications. Although this diagnostic and regulatory capability currently exists, a great deal of hardware and/or software resources must be consumed in order to perform this task, increasing system cost, size and complexity.

In many cases, such as where restricting the steady state/DC value of the signal is acceptable, the EPS system error requirements established by vehicle safety standards may be met by implementing a firewall approach, whereby a series of checks are employed to ensure that the torque commands reaching the firewall are limited to a maximum safe value. Current design techniques limit this maximum value to the steady state value 202 shown in FIG. 1. Although this approach works well for relatively steady state signals, it is not very effective for signals that operate within the transient portion 204 of the graph shown in FIG. 1, thus requiring designers to sacrifice EPS system performance in order to limit this transient portion 204 to be within the steady state value 202.

BRIEF SUMMARY

A method for conforming an input signal to vehicle steering fault requirements comprising: receiving an input signal; dividing the input signal into a low frequency component and a high frequency component; limiting the low frequency component to a maximum value, to create a limited signal; and combining the limited signal and the high frequency component, to create a limited command signal.

A system for conforming an input signal to vehicle steering fault requirements comprising: an electric steering system generating an input signal in operable communication with a low pass filter configured to generate a low frequency component from the input signal. The input signal is also in operable communication with one of: a high pass filter to generate a high pass component and a first summing device in operable communication with said low pass filter to generate the high pass component. The system also includes a maximum value limiting device for limiting the low frequency component to a maximum value and to create a limited signal, the maximum value limiting device is in operable communication with the low pass filter. Additionally, the system includes a second summing device for combining the limited signal and the high frequency component to create a limited command signal, the signal summing device is in operable communication with the maximum value limiting device and one of, the high pass filter and the first summing device whichever generates the high pass component.

Also disclosed herein in an exemplary embodiment is a system for conforming an input signal to vehicle steering fault requirements comprising: a means for obtaining an input signal; a means for dividing the input signal into a low frequency component and a high frequency component; a means for limiting the low frequency component to a maximum value to create a limited signal; and a means for combining the limited signal and the high frequency component to create a limited command signal.

Also disclosed herein is a storage medium encoded with a machine-readable computer program code, the storage medium including instructions for causing a controller to implement the above-mentioned method for conforming an input signal to vehicle steering fault requirements.

Also disclosed herein is a computer data signal, said data signal comprising code configured to cause a controller to implement a method for conforming an input signal to vehicle steering fault requirements.

In a further disclosure herein of another exemplary embodiment, a method for conforming an input signal to fault requirements comprising: receiving an input signal; dividing the input signal into a low frequency component and a high frequency component; limiting the low frequency component to a maximum value, to create a limited signal; and combining the limited signal and the high frequency component, to create a limited command signal.

Moreover, also disclosed is a system for conforming an input signal to fault requirements comprising: an input signal in operable communication with a low pass filter configured to generate a low frequency component from the input signal. The input signal is also in operable communication with one of: a high pass filter to generate a high pass component and a first summing device in operable communication with said low pass filter to generate the high pass component. The system also includes a maximum value limiting device for limiting the low frequency component to a maximum value and to create a limited signal, the maximum value limiting device is in operable communication with the low pass filter. Additionally, the system includes a second summing device for combining the limited signal and the high frequency component to create a limited command signal, the signal summing device is in operable communication with the maximum value limiting device and one of, the high pass filter and the first summing device whichever generates the high pass component.

Further, disclosed herein in an exemplary embodiment is a system for conforming an input signal to fault requirements comprising: a means for obtaining an input signal; a means for dividing the input signal into a low frequency component and a high frequency component; a means for limiting the low frequency component to a maximum value to create a limited signal; and a means for combining the limited signal and the high frequency component to create a limited command signal.

Yet, another exemplary embodiment discloses a storage medium encoded with a machine-readable computer program code, the storage medium including instructions for causing a controller to implement the above-mentioned method for conforming an input signal to vehicle steering fault requirements.

Finally, disclosed herein is a computer data signal, said data signal comprising code configured to cause a controller to implement a method for conforming an input signal to vehicle steering fault requirements

BRIEF DESCRIPTION OF THE DRAWINGS

The present invention will now be described, by way of an example, with references to the accompanying drawings, wherein like elements are numbered alike in the several figures in which:

FIG. 2 shows a system diagram illustrating a command limiting scheme, in accordance with an exemplary embodiment; and FIG. 3 shows a block diagram describing a method for conforming to vehicle steering fault requirements using a command limiting scheme, in accordance with an exemplary embodiment.

DETAILED DESCRIPTION OF AN EXEMPLARY EMBODIMENT

Figure 1:
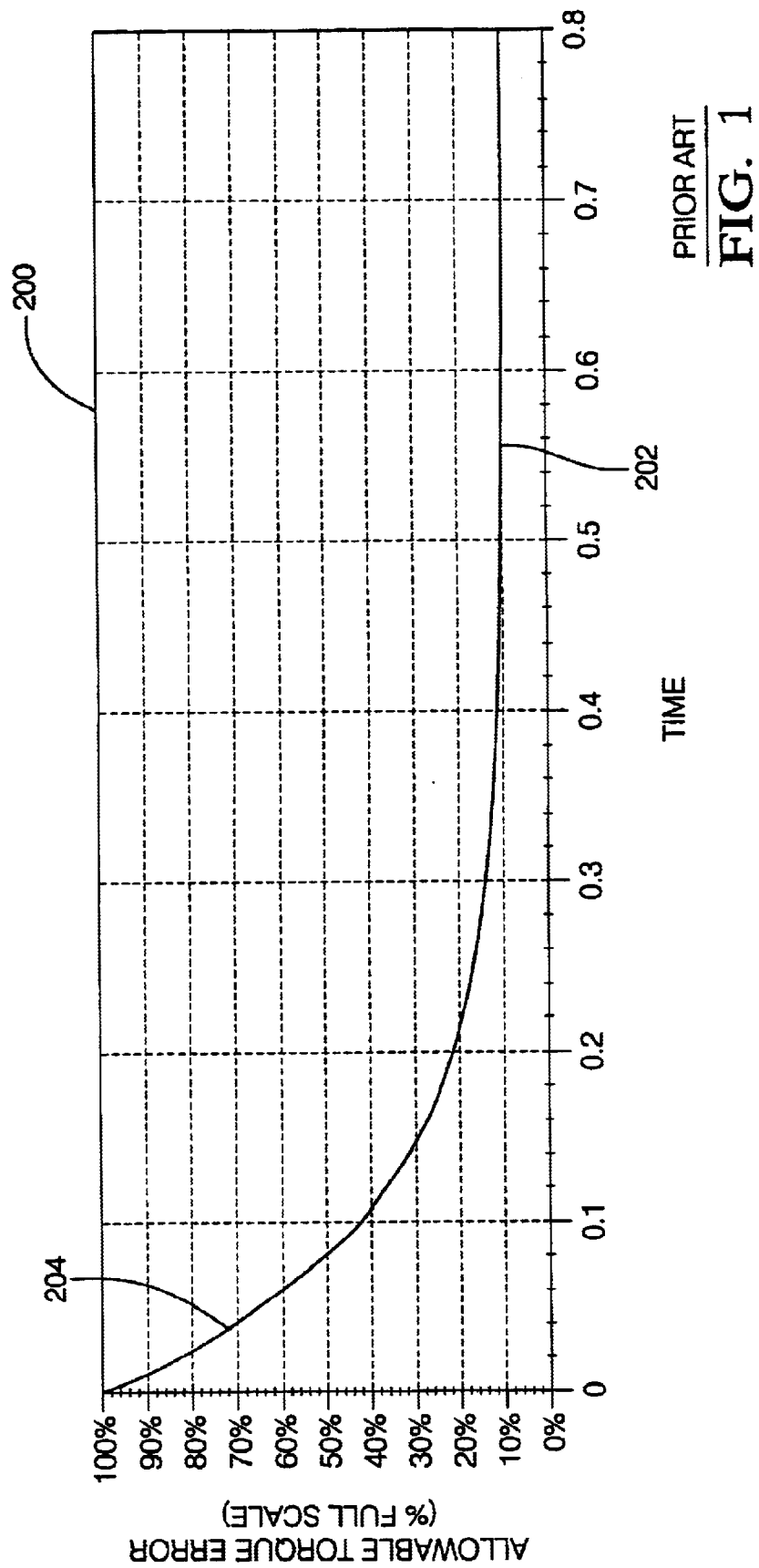
FIG. 1 shows a graph representing torque error per event time as defined by vehicle level safety requirement standards.

An exemplary embodiment is described herein by way of illustration as may be applied to a device having an electric power steering (EPS) system and more specifically to a vehicle having an electric power steering (EPS) system. While an exemplary embodiment is shown and described herein below, it will be appreciated by those skilled in the art that the invention is not limited to the embodiment and application described herein, but also to any vehicle or device which employs a system where meeting fault requirements is desired, such as a rear steer system, an active front steer system, a steer-by-wire system or a braking system. Those skilled in the art will appreciate that a variety of potential implementations and configurations are possible within the scope of the disclosed embodiments.

Referring to FIG. 2, a system diagram illustrating a command-limiting scheme 1 is shown and described. In accordance with an exemplary embodiment, a command limiting scheme 1 is illustrated and preferably includes a vehicle sensor 2, an electric power steering (EPS) system 4, a low pass filtering device 6, a high pass filtering device 8, a maximum value limiting device 10, a signal summing device 12 and a steering gear assembly 14. EPS system 4 is preferably communicated with vehicle sensor 2, low pass filtering device 6 and high pass filtering device 8. In addition, low pass filtering device 6 is preferably further communicated with maximum value limiting device 10. Moreover, signal-summing device 12 is preferably communicated with maximum value limiting device 10, high pass filtering device 8 and steering gear assembly 14.

Referring to the figures, a method for conforming an input signal, such as a torque command signal, to vehicle steering fault requirements using a command-limiting scheme 1 is illustrated and described. In accordance with an exemplary embodiment, EPS system 4 obtains an input signal 16 as shown in step 102. EPS system may either generate input signal 16 or EPS system may receive input signal 16 from a vehicle sensor 2. Input signal 16 is then divided into a low frequency component, or steady state signal 18, and a high frequency component, or transient signal 20, by communicating input signal 16 to low pass filtering device 6 and high pass filtering device 8, as shown in step 104. Low pass filtering device 6 preferably filters out the high frequency components of input signal 16 to create steady state signal 18. High pass filtering device 8 preferably filters out the low frequency components of input signal 16 to create transient signal 20.

In accordance with an exemplary embodiment, steady state signal 18 is then communicated to a maximum value limiting device 10, where maximum value limiting device 10 processes steady state signal 18 to create a limited signal 22 having a predetermined limited magnitude, as shown in step 106. Limited signal 22 and transient signal 20 are then communicated to a signal summing device 12, where signal summing device 12 combines limited signal 22 and transient signal 20 to create a limited command signal 24, as shown in step 108. This limited command signal 24 is then communicated to steering gear assembly 14.

In accordance with an exemplary embodiment, low pass filtering device 6 preferably includes a low pass cut-off frequency and high pass filtering device 8 preferably includes a high pass cut-off frequency. In order to ensure that input signal 14 is not modified in any way except when input signal 14 exceeds a predetermined safety limit, such as that shown in FIG. 1, the low pass cut-off frequency is preferably chosen to be equal to the high pass cut-off frequency. In addition, although the low pass cut-off frequency, the high pass cut-off frequency and/or the predetermined limited magnitude are preferably selected to cause limited command signal 24 to have a desired characteristic, such as that shown in FIG. 1, any device, method or combination thereof may be used to control the characteristic of limited command signal 24. In accordance with an exemplary embodiment, limited command signal 24 should be constrained to be less than or equal a desired characteristic, such as that shown in FIG. 1.

In accordance with an exemplary embodiment, low pass filtering device 6 may be any low pass filtering device, circuitry or method suitable to the desired end purpose. In addition, low pass filtering device 6 may be implemented using hardware, software or any combination thereof.

In accordance with an exemplary embodiment, high pass filtering device 8 may be any high pass filtering device, circuitry or method suitable to the desired end purpose. In addition, high pass filtering device 8 may be implemented using hardware, software or any combination thereof.

In accordance with an exemplary embodiment, maximum value limiting device 10 may be any maximum value limiting device, circuitry or method suitable to the desired end purpose. In addition, maximum value limiting device 10 may be implemented using hardware, software or any combination thereof.

In accordance with an exemplary embodiment, signal summing device 12 may be any signal summing device, circuitry or method suitable to the desired end purpose. In addition, signal-summing device 12 may be implemented using hardware, software or any combination thereof.

In accordance with an exemplary embodiment, input signal 16 may be any signal suitable to the desired end purpose, such as torque command and/position data. In addition, although an exemplary embodiment is described herein by way of illustration as may be applied to a device having a single input signal 16 and a single output 24, it will be appreciated by those skilled in the art that the invention is not limited to embodiments having a single input and/or a single output, but rather may be applied to embodiments having multiple inputs and/or multiple outputs and/or any combination thereof.

In accordance with an exemplary embodiment, the processing of FIG. 3 may be implemented by a controller 50 disposed internal, external, or internally and externally to an engine control unit (ECU). In addition, processing of FIG. 3 may be implemented through a controller operating in response to a computer program. In order to perform the prescribed functions and desired processing, as well as the computations therefore (e.g., the execution of voltage mode motor control algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include signal input signal filtering to enable accurate sampling and conversion or acquisitions of such signals from communications interfaces.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method for conforming an input signal to vehicle steering fault requirements comprising:
   obtaining an input signal;
   dividing said input signal into a low frequency component and a high frequency component;
   limiting said low frequency component to a maximum value to create a limited signal; and
   combining said limited signal and said high frequency component to create a limited command signal.

2. The method of claim 1 wherein said dividing comprises applying said input signal to a low pass filtering device including a low pass cut-off frequency and subtracting said low frequency component from said input signal to generate said high frequency component.

3. The method of claim 1 wherein said dividing comprises applying said input signal to a low pass filtering device including a low pass cut-off frequency.

4. The method of claim 3 wherein said low pass cut-off frequency is configured to achieve said vehicle steering fault requirements.

5. The method of claim 3 wherein said dividing comprises applying said input signal to a high pass filtering device including a high pass cut-off frequency.

6. The method of claim 5 wherein said high pass cut-off frequency is configured to achieve said vehicle steering fault requirements.

7. The method of claim 5 wherein said low pass cut-off frequency and said high pass cut-off frequency are substantially equal.

8. The method of claim 1 wherein said dividing comprises applying said input signal to a high pass filtering device.

9. The method of claim 1 wherein said limiting comprises applying said low frequency component to a maximum value limiting device.

10. The method of claim 1 wherein said combining comprises applying said limited signal and said high frequency component to a summation.

11. The method of claim 1 wherein said combining comprises applying said limited signal and said high frequency component to a summation.

12. A system for conforming an input signal to vehicle steering fault requirements comprising:
    an electric steering system generating an input signal in operable communication with
    a low pass filter, said low pass filter configured to generate a low frequency component from said input signal and one of a high pass filter to generate a high pass component and a first summing device in operable communication with said low pass filter to generate said high pass component;
    a maximum value limiting device for limiting said low frequency component to a maximum value and to create a limited signal, said maximum value limiting device in operable communication with said low pass filter; and
    a second summing device for combining said limited signal and said high frequency component to create a limited command signal, said signal summing device in operable communication with said maximum value limiting device and one of said high pass filter and said first summing device whichever generates said high pass component.

13. The system of claim 12 wherein said low pass filtering device includes a low pass cut-off frequency.

14. The system of claim 13 wherein said low pass cut-off frequency is configured to achieve said vehicle steering fault requirements.

15. The system of claim 13 wherein said high pass filtering device includes a high pass cut-off frequency.

16. The system of claim 15 wherein said high pass cut-off frequency is configured to achieve said vehicle steering fault requirements.

17. The system of claim 15 wherein said low pass cut-off frequency and said high pass cut-off frequency are substantially equal.

18. A system for conforming an input signal to vehicle steering fault requirements comprising:

means for obtaining an input signal;

means for dividing said input signal into a low frequency component and a high frequency component;

means for limiting said low frequency component to a maximum value to create a limited signal; and means for combining said limited signal and said high frequency component to create a limited command signal.

19. A storage medium encoded with a machine-readable computer program code, the medium including instructions for causing a controller to implement a method for conforming an input signal to vehicle steering fault requirements comprising:

obtaining an input signal;

dividing said input signal into a low frequency component and a high frequency component;

limiting said low frequency component to a maximum value to create a limited signal; and combining said limited signal and said high frequency component to create a limited command signal.

20. A computer data signal, said data signal comprising code configured to cause a controller to implement a method for conforming an input signal to vehicle steering fault requirements, the method comprising:

obtaining an input signal;

dividing said input signal into a low frequency component and a high frequency component;

limiting said low frequency component to a maximum value to create a limited signal; and combining said limited signal and said high frequency component to create a limited command signal.

21. A method for conforming an input signal to fault requirements comprising:

obtaining an input signal;

dividing said input signal into a low frequency component and a high frequency component;

limiting the low frequency component to a maximum value to create a limited signal; and combining said limited signal and said high frequency component to create a limited command signal.

22. A system for conforming an input signal to fault requirements comprising:

an input signal in operable communication with a low pass filter, said low pass filter configured to generate a low frequency component from said input signal and one of a high pass filter to generate a high pass component and a first summing device in operable communication with said low pass filter to generate said high pass component;

a maximum value limiting device for limiting said low frequency component to a maximum value and to create a limited signal, said maximum value limiting device in operable communication with said low pass filter; and a second summing device for combining said limited signal and said high frequency component to create a limited command signal, said signal summing device in operable communication with said maximum value limiting device and one of said high pass filter and said first summing device whichever generates said high pass component.

23. A system for conforming an input signal to fault requirements comprising:

means for obtaining an input signal;

means for dividing said input signal into a low frequency component and a high frequency component;

means for limiting said low frequency component to a maximum value to create a limited signal; and means for combining said limited signal and said high frequency component to create a limited command signal.

24. A storage medium encoded with a machine-readable computer program code, the medium including instructions for causing a controller to implement a method for conforming an input signal to fault requirements comprising:

obtaining an input signal;

dividing said input signal into a low frequency component and a high frequency component;

limiting said low frequency component to a maximum value to create a limited signal; and combining said limited signal and said high frequency component to create a limited command signal.

25. A computer data signal, said data signal comprising code configured to cause a controller to implement a method for conforming an input signal to fault requirements, the method comprising:

obtaining an input signal;

dividing said input signal into a low frequency component and a high frequency component;

limiting said low frequency component to a maximum value to create a limited signal; and combining said limited signal and said high frequency component to create a limited command signal.

* * * * *